(12) United States Patent
Eckert

(10) Patent No.: US 7,716,363 B1
(45) Date of Patent: May 11, 2010

(54) METHOD AND APPARATUS OF PROVIDING ZERO CONFIGURATION SINGLE SOURCE MULTICASTING REPORTING

(75) Inventor: Toerless Eckert, Mountain View, CA (US)

(73) Assignee: Cisco Technology, Inc., San Jose, CA (US)

(*) Notice: Subject to any disclaimer, the term of this patent is extended or adjusted under 35 U.S.C. 154(b) by 1048 days.

(21) Appl. No.: 10/776,940

(22) Filed: Feb. 10, 2004

(51) Int. Cl.
| | |
|---|---|
| G06F 15/173 | (2006.01) |
| G06F 15/16 | (2006.01) |
| G01R 31/08 | (2006.01) |
| H04J 1/16 | (2006.01) |
| H04J 3/14 | (2006.01) |
| H04L 12/26 | (2006.01) |
| H04L 12/28 | (2006.01) |
| G06F 11/00 | (2006.01) |
| H04N 7/16 | (2006.01) |
| G08C 15/00 | (2006.01) |
| H04J 3/26 | (2006.01) |
| H04L 1/00 | (2006.01) |
| H04L 12/56 | (2006.01) |

(52) U.S. Cl. .............. 709/238; 709/228; 709/231; 709/237; 709/249; 370/230; 370/392; 370/395.5; 370/432

(58) Field of Classification Search .......... 709/227–231, 709/237, 249; 725/139, 151; 370/230, 389–393, 370/395.43, 395.5, 395.52, 432
See application file for complete search history.

(56) References Cited

U.S. PATENT DOCUMENTS

| | | | | |
|---|---|---|---|---|
| 6,269,080 B1* | 7/2001 | Kumar | ...................... | 370/236 |
| 6,370,142 B1* | 4/2002 | Pitcher et al. | ............... | 370/390 |
| 6,741,575 B1* | 5/2004 | Zhang et al. | ................. | 370/329 |
| 6,853,639 B1* | 2/2005 | Watanuki et al. | ............ | 370/390 |
| 6,928,656 B1* | 8/2005 | Addington | ................... | 725/111 |
| 6,947,434 B2* | 9/2005 | Hundscheidt et al. | ....... | 370/401 |
| 6,950,432 B2* | 9/2005 | Chen et al. | ................... | 370/390 |
| 6,950,439 B1* | 9/2005 | Bhagavath et al. | .......... | 370/432 |
| 7,032,242 B1* | 4/2006 | Grabelsky et al. | ............. | 726/11 |
| 7,061,880 B2* | 6/2006 | Basilier | ...................... | 370/312 |
| 7,065,577 B1* | 6/2006 | Keller-Tuberg | ............. | 709/227 |
| 7,099,315 B2* | 8/2006 | Ambe et al. | ................. | 370/386 |
| 7,120,147 B2* | 10/2006 | Derango et al. | ............. | 370/390 |
| 7,133,371 B2* | 11/2006 | Helm et al. | .................. | 370/270 |
| 7,221,660 B1* | 5/2007 | Simonson et al. | ........... | 370/312 |
| 7,228,356 B2* | 6/2007 | Nguyen et al. | .............. | 709/231 |
| 7,233,987 B2* | 6/2007 | Watkinson | ................... | 709/223 |

(Continued)

OTHER PUBLICATIONS

Deering, S. et al. "Multicast Listener Discovery (MLD) for IPv6," RFC 2710, Oct. 1999, pp. 1-22.*

(Continued)

*Primary Examiner*—Rupal D Dharia
*Assistant Examiner*—Melvin H Pollack
(74) *Attorney, Agent, or Firm*—Cesari and McKenna, LLP

(57) ABSTRACT

Methods and apparatus for providing request compatibility in a multicast system are disclosed. In one aspect, a layer 2 switch is configured to receive traffic requests from a group of receivers, determine whether the traffic requests contain incompatible request types. If incompatible request types exist, then the switch may separate the traffic requests into groups based on type, and send the requests of different types to a router from distinct addresses.

32 Claims, 4 Drawing Sheets

U.S. PATENT DOCUMENTS

| | | | | |
|---|---|---|---|---|
| 7,236,465 B2* | 6/2007 | Banerjee et al. | ............ | 370/312 |
| 7,245,614 B1* | 7/2007 | Podar et al. | ............ | 370/389 |
| 7,266,686 B1* | 9/2007 | Monteiro et al. | ............ | 713/161 |
| 7,289,534 B1* | 10/2007 | Bailey et al. | ............ | 370/468 |
| 7,305,010 B2* | 12/2007 | Hayashi et al. | ............ | 370/473 |
| 7,333,491 B2* | 2/2008 | Chen et al. | ............ | 370/392 |
| 7,339,903 B2* | 3/2008 | O'Neill | ............ | 370/313 |
| 7,359,939 B2* | 4/2008 | Poulsen et al. | ............ | 709/204 |
| 7,360,084 B1* | 4/2008 | Hardjono | ............ | 713/163 |
| 7,366,191 B2* | 4/2008 | Higashiyama | ............ | 370/406 |
| 7,369,541 B2* | 5/2008 | Hundscheidt et al. | ............ | 370/352 |
| 7,389,359 B2* | 6/2008 | Jain et al. | ............ | 709/238 |
| 7,391,772 B2* | 6/2008 | Hooper et al. | ............ | 370/390 |
| 7,454,518 B1* | 11/2008 | Cain et al. | ............ | 709/238 |
| 7,499,466 B2* | 3/2009 | Hundscheidt et al. | ............ | 370/432 |
| 7,502,372 B2* | 3/2009 | Tsuchiya et al. | ............ | 370/390 |
| 7,512,124 B2* | 3/2009 | Sangroniz et al. | ............ | 370/390 |
| 7,590,116 B2* | 9/2009 | He et al. | ............ | 370/392 |
| 7,602,783 B2* | 10/2009 | Aimoto | ............ | 370/392 |
| 7,606,186 B2* | 10/2009 | Hundscheidt et al. | ............ | 370/312 |
| 7,613,836 B2* | 11/2009 | Tober et al. | ............ | 709/250 |
| 7,631,100 B2* | 12/2009 | Ben-Zvi et al. | ............ | 709/245 |
| 2003/0041171 A1* | 2/2003 | Kobayashi | ............ | 709/242 |
| 2003/0147392 A1* | 8/2003 | Hayashi et al. | ............ | 370/390 |
| 2004/0022244 A1* | 2/2004 | Boers et al. | ............ | 370/390 |
| 2004/0100983 A1* | 5/2004 | Suzuki | ............ | 370/432 |
| 2004/0252690 A1* | 12/2004 | Pung et al. | ............ | 370/390 |
| 2005/0005306 A1* | 1/2005 | Kim et al. | ............ | 725/131 |
| 2005/0076207 A1* | 4/2005 | Park et al. | ............ | 713/163 |
| 2006/0159092 A1* | 7/2006 | Boers et al. | ............ | 370/390 |
| 2006/0184683 A1* | 8/2006 | Bosscha et al. | ............ | 709/230 |
| 2006/0187950 A1* | 8/2006 | Bou-Diab et al. | ............ | 370/432 |
| 2006/0242311 A1* | 10/2006 | Mai et al. | ............ | 709/229 |
| 2007/0008969 A1* | 1/2007 | Elstermann et al. | ............ | 370/390 |
| 2007/0076703 A1* | 4/2007 | Yoneda et al. | ............ | 370/389 |
| 2007/0121628 A1* | 5/2007 | Gainer et al. | ............ | 370/390 |
| 2007/0127471 A1* | 6/2007 | Cantenot | ............ | 370/390 |

OTHER PUBLICATIONS

Haberman, B. "Source Address Selection for the Multicast Listener Discovery (MLD) Protocol," RFC 3590, Sep. 2003, pp. 1-6.*

Vida, R. and Costa, L. "Multicast Listener Discovery Version 2 (MLDv2) for IPv6," RFC 3810, Jun. 2004, pp. 1-62.*

Conta, A. and Deering, S. "Internet Control Message Protocol (ICMPv6) for the Internet Protocol Version 6 (IPv6) Specification," RFC 2463, Dec. 1998, pp. 1-18.*

Cain, B. et al. "Internet Group Management Protocol, Version 3," RFC 3376, Oct. 2002, pp. 1-53.*

Fenner, W. "Internet Group Management Protocol, Version 2," RFC 2236, Nov. 1997, pp. 1-24.*

Mogul, J. and Postel, J. "Internet Standard Subnetting Procedure," RFC 950, Aug. 1985, pp. 1-18.*

Mogul, Jeffrey. "Broadcasting Internet Datagrams in the Presence of Subnets," RFC 922, Oct. 1984, pp. 1-12.*

Metz, Chris. "IP Anycast: Point-to-(Any) Point Communication," IEEE Internet Computing, vol. 6, Issue 2, Mar./Apr. 2002, pp. 94-98.*

Judge, Paul and Ammar, Mostafa. "Gothic: A Group Access Control Architecture for Secure Multicast and Anycast," Proceedings of the IEEE $21_{st}$ Annual Joint Conference of the IEEE Computer and Communications Societies (INFOCOM), vol. 3, 2002, pp. 1547-1556.*

Faloutsos, Michalis, et al. "QoSMIC: Quality of Service Sensitive Multicast Internet Protocol," ACM SIGCOMM Computer Communication Review, vol. 28, Issue 4, Oct. 1998, pp. 144-153.*

Acharya, Arup, et al. "IP Multicast Extensions for Mobile Internetworking," Proceedings of the 15th Annual Joint Conference of the IEEE Computer Societies (INFOCOM), Networking the Next Generation, vol. 1, Mar. 1996, pp. 67-74.*

Ooms, D. et al. "Overview of IP Multicast in a Multi-Protocol Label Switching (MPLS) Environment," RFC 3353, Aug. 2002, pp. 1-30.*

Bhattacharyya, S. "An Overview of Source-Specific Multicast (SSM)," RFC 3569, Jul. 2003, pp. 1-14.*

Deering, S. "Host Extensions for IP Multicasting," RFC 1112, Aug. 1989, pp. 1-17.*

Thaler, D. et al. "Socket Interface Extensions for Multicast Source Filters," RFC 3678, Jan. 2004, pp. 1-18.*

Fenner, B. and Meyer, D. "Multicast Source Discovery Protocol (MSDP)," RFC 3618, Oct. 2003, pp. 1-19.*

Haberman, B. and Thaler, D. "Unicast-Prefix-based IPv6 Multicast Addresses," RFC 3306, Aug. 2002, pp. 1-7.*

* cited by examiner

METHOD AND APPARATUS OF PROVIDING ZERO CONFIGURATION SINGLE SOURCE MULTICASTING REPORTING

BACKGROUND

1. Field of the Disclosure

The disclosure relates generally to data communications, and in particular, to providing a safe Single Source Multicasting (SSM) reporting scheme requiring little or no user configuration nor dependency on additional protocols.

2. The Prior Art

Audio/video and any other type of content traffic can be provided through Intranets and the Internet to homes and businesses via a mechanism called IP multicast in which the traffic is only sent once by the content source, and replicated by the network to all interested receivers. Typically, the traffic is requested by receivers using a protocol called the Internet Group Membership Protocol (IGMP). Via IGMP, a receiver specifies a so called IP multicast group G identifying the content the receiver is interested in (like a TV station) and, starting with version 3 of IGMP, optionally also the IP address of the content source.

FIG. 1 shows a diagram of a prior art multicasting system 100. A content source 105 with IP source address S is coupled to a network 110, such as the Internet, and is configured to stream content traffic to a group of receivers 140 using IP multicast group address G. Typically, the receivers 140 are coupled to the network 110 through a Local Area Network (LAN) 150, such as an Ethernet network, which is coupled to the Internet through router 120.

In a typical example, one or more of the receivers Rn on the network 140 desire to acquire content provided by the source 105.

As is known in the art, IP multicast are packets are transmitted with a pair of addresses in the form of (S,G), where S is the source address, and G is the address defining a group of destinations, such as the group of receivers 140. Typically, the address range for S is from the IP address 1.0.0.0 to 223.255.255.255 and the address range for G is from the IP address 224.0.0.0 to 239.255.255.255.

When a receiver 140 desires to receive content from the source 105, it will send IGMP messages towards router 120 to indicate the content it is interested in group address. The router 120 and other routers within the network cloud 110 will use IP multicast routing protocols to acquire the content, and send it into LAN 150. The content will be available to all systems connected to the LAN; thus, those receivers who do not desire the content will simply ignore the content.

Router 120 and the other routers in 110 can run one of two forms of IP multicast routing: Any Source Multicast (ASM) or Source Specific Multicast (SSM). If they run ASM, it is sufficient for router 120 to receive IGMP messages from receivers on 150 that do only contain the group address G, the source address S is optional. If they run SSM then router 120 must receive IGMP messages with both the IP multicast group address G and the IP source address S, or else router 120 and routers in 110 will not be able to correctly forward the content to LAN 150.

FIG. 2 contains the structure of FIG. 1 and further includes an L2 switch 130 provided to more efficiently manage bandwidth on the access network 150. To prevent content from clogging the ports of receivers, networks typically include the L2 switch 130, also known as a LAN switch, which is a device configured to direct traffic only towards interested ports.

This directing may be accomplished through IGMP "snooping", where L2 switch passively listens to IGMP messages and learns about the traffic demands on the host(s). L2 switches are typically designed to be a plug-and-play product that requires little or no user configuration.

Further versions of the IGMP protocol have attempted to add features and functionality. For example, IGMP version 2 can only provide for Any Source Multicasting (ASM), which accepts traffic from any source.

IGMP version 3 defines two types of requests. One host request is a group request that specifies a particular source be included, i.e. [G, INC{Sn}]. Another request is a group request that excludes a particular source, i.e. [G, EXL{Sn}].

BRIEF DESCRIPTION OF THE DRAWING FIGURES

DETAILED DESCRIPTION

Figure 1:
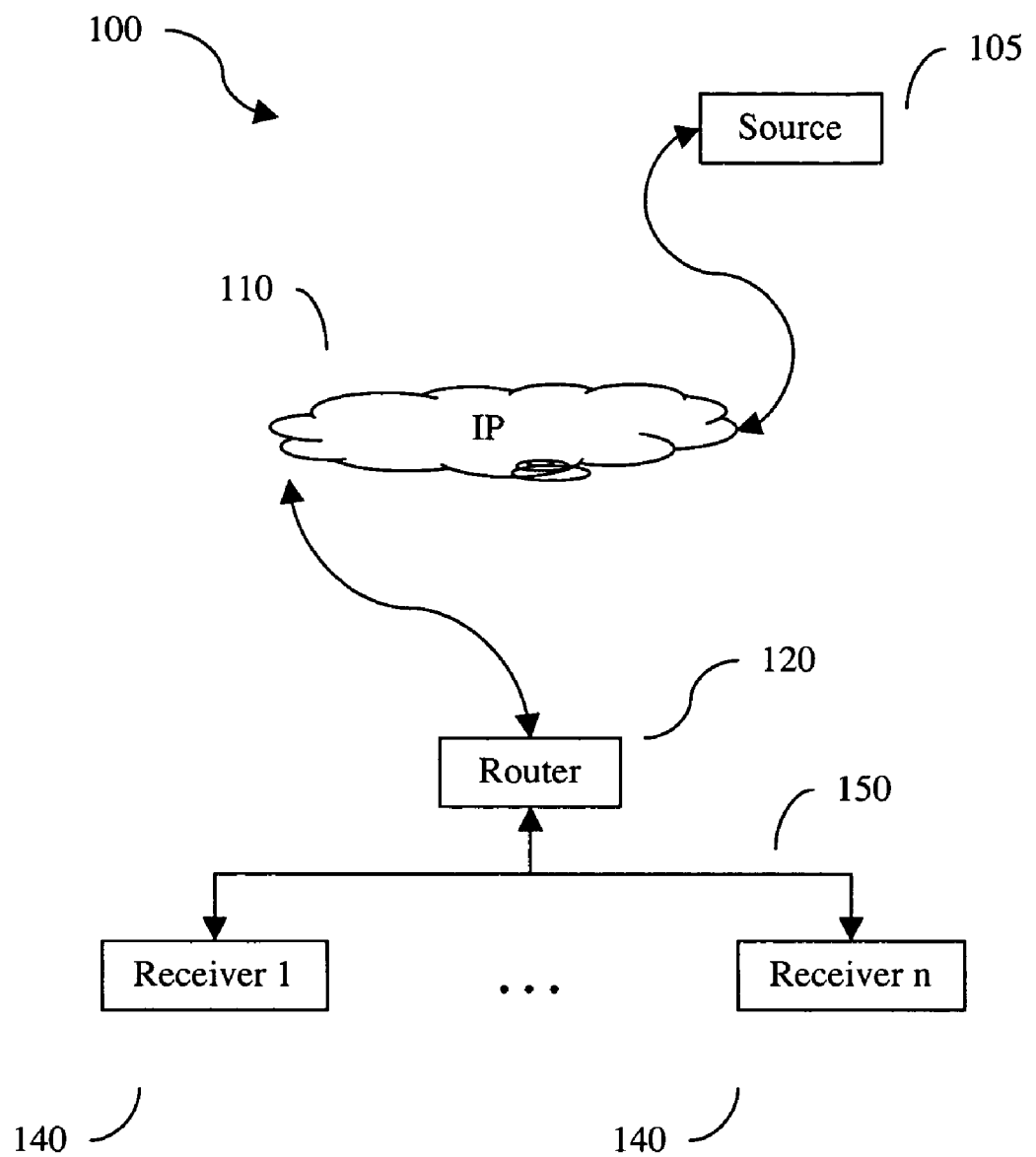
FIG. 1 is a conceptual block diagram of a prior art multicast system.
Figure 2:
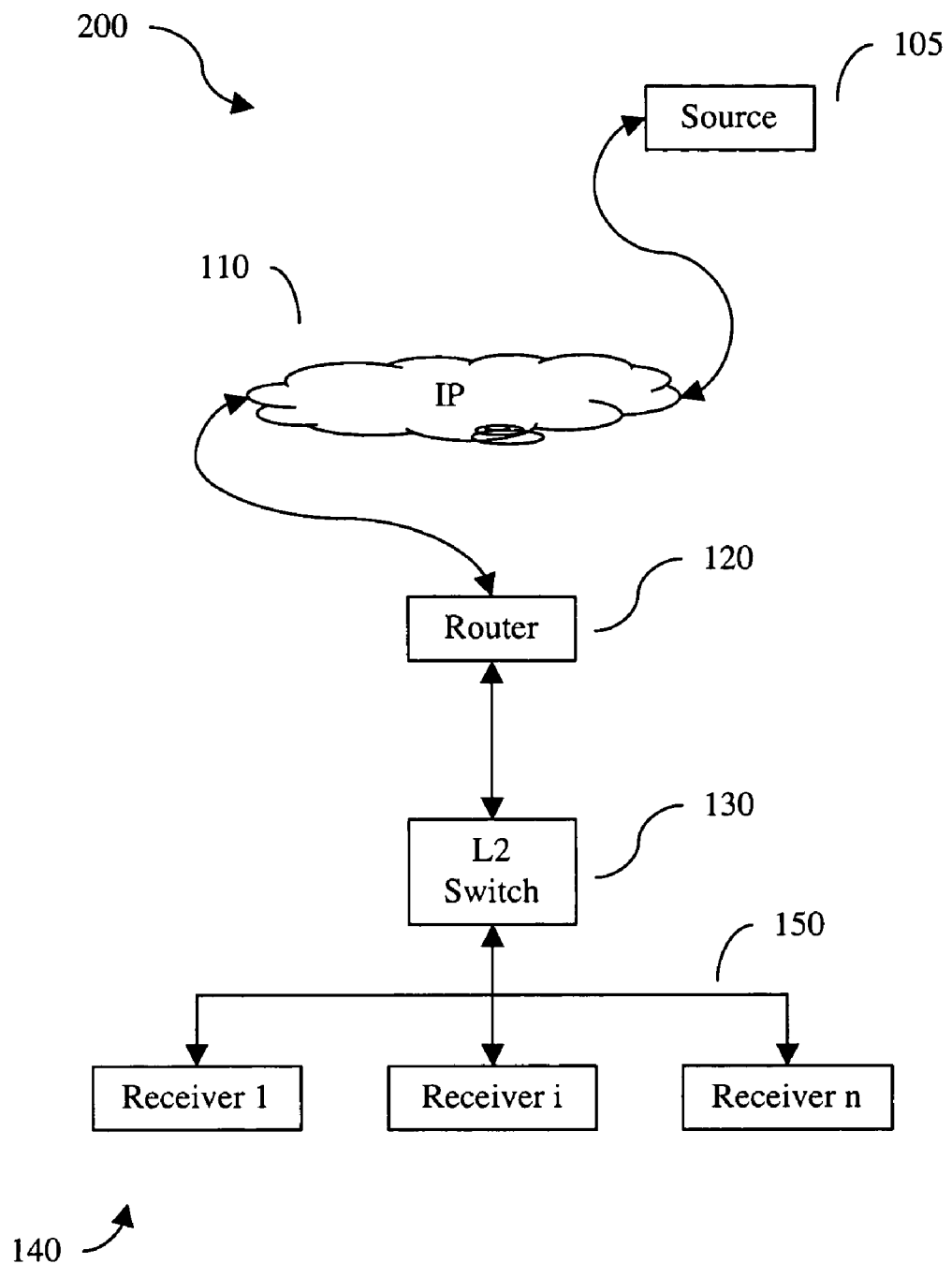
FIG. 2 is a conceptual block diagram of a prior art multicast system including a layer 2 switch.

Persons of ordinary skill in the art will realize that the following description is illustrative only and not in any way limiting. Other modifications and improvements will readily suggest themselves to such skilled persons having the benefit of this disclosure. In the following description, like reference numerals refer to like elements throughout.

This disclosure may relate to data communications. Various disclosed aspects may be embodied in various computer and machine readable data structures. Furthermore, it is contemplated that data structures embodying the teachings of the disclosure may be transmitted across computer and machine readable media, and through communications systems by use of standard protocols such as those used to enable the Internet and other computer networking standards.

The disclosure may relate to machine readable media on which are stored various aspects of the disclosure. It is contemplated that any media suitable for retrieving instructions is within the scope of the present disclosure. By way of example, such media may take the form of magnetic, optical, or semiconductor media, and may be configured to be accessible by a machine as is known in the art.

Various aspects of the disclosure may be described through the use of flowcharts. Often, a single instance of an aspect of the present disclosure may be shown. As is appreciated by those of ordinary skill in the art, however, the protocols, processes, and procedures described herein may be repeated continuously or as often as necessary to satisfy the needs described herein. Accordingly, the representation of various aspects of the present disclosure through the use of flowcharts should not be used to limit the scope of the present disclosure.

The aforementioned logic makes the task of the L2 switch very difficult, as executing the IGMP v3 protocol while maintaining backward compatibility with SSM logic can result in contradictory logic.

For example, one issue is scalability. In modern systems, as many as 400 receivers may be connected to a L2 switch, with several L2 switches coupled to a single router. Proxy reporting is used to off load some of the work of the router. In proxy reporting, the L2 switch aggregates content requests from its attached receivers, and presents only one request to the router, making the L2 switch appear as another host receiver to the router.

A complication arises when the L2 switch attempts to aggregates multiple requests including both a single-source request (IGMP v3) and an older any-source request (IGMP v2), as the L2 switch will not be able to aggregate these into a single report and appear as a single host as expected by the router.

For example, if the switch receives a series of requests including both a [G, INC{X}] and a [G, EXL{<empty>}], the only way to logically resolve these is to issue a [G, EXL{ . . . }] request if the switch is to appear as one host to the router. Thus, the switch will be forced to issue conflicting requests and unable to issue a single request that is compatible with all previous multicast protocols. For example, if the router utilizes explicit tracking of hosts sending IGMP reports and receives a INC request from the switch, followed by a EXL request, the router will be forced to switch between modes, in conflict with the protocol.

Figure 3:
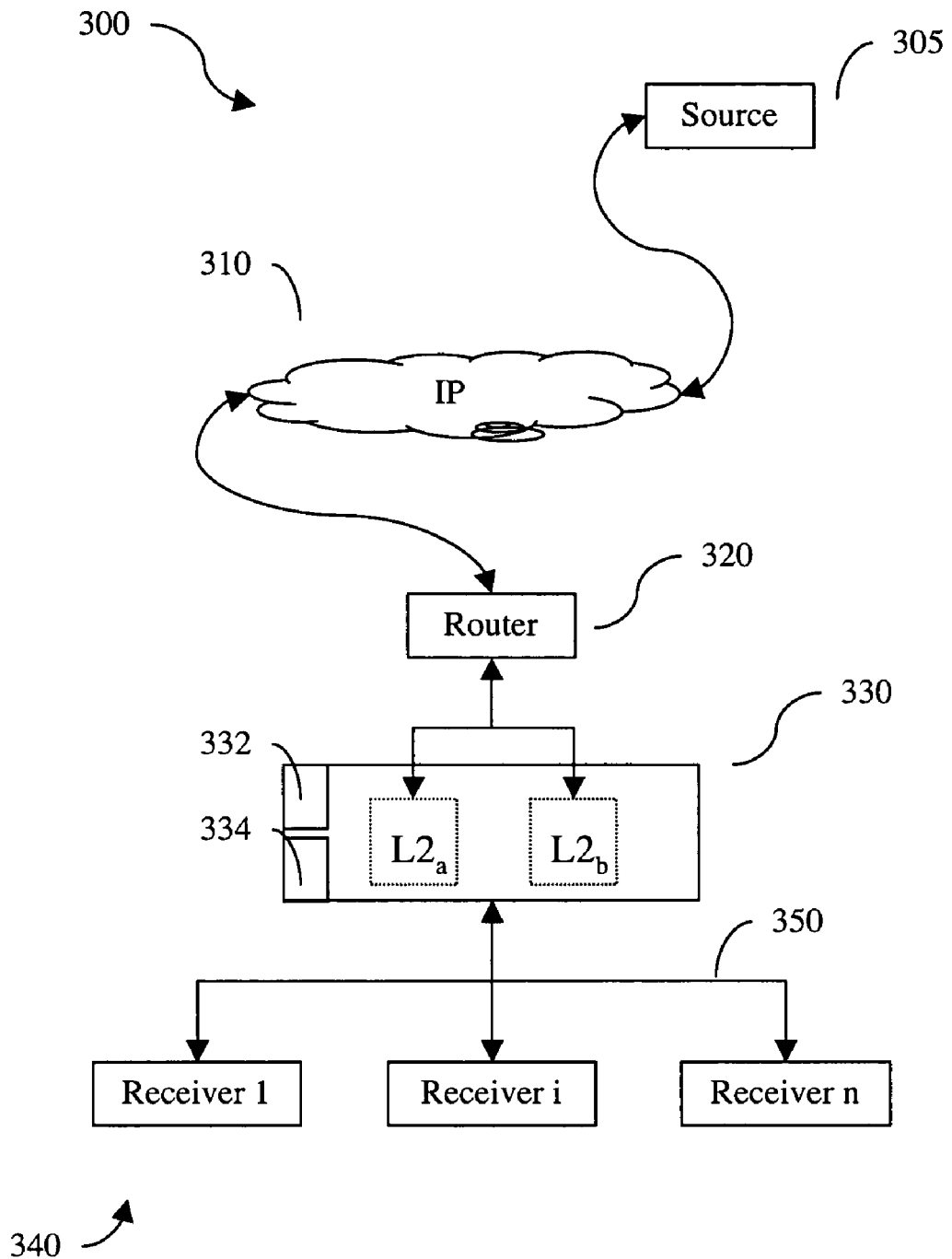
FIG. 3 is a conceptual block diagram of a multicast system configured in accordance with the teachings of this disclosure.

FIG. 3 is block diagram of a multicast system 300 configured according to the teachings of this disclosure.

FIG. 3 includes a content source 305 coupled to a network 310, such as the Internet, and is configured to stream content traffic to a group of receivers 340. The receivers 140 may be coupled to the network 310 through a Local Area Network (LAN) 350, such as an Ethernet network, which is coupled to the Internet through router 120.

To provide compatibility with the various multicast protocols, the system 300 includes an L2 switch 330, including a processor 332 and associated memory 334, configured in accordance with the teachings of this disclosure to provide multiple identities to the router 320. It will be appreciated that the switch 330 may include multiple ports, and each receiver may be coupled to through a distinct port of switch 330, or alternatively multiple receivers may be coupled through a single port.

As is appreciated by those of ordinary skill in the art, the IGMP protocols provide for proxy reporting with IGMP version 3 from the anonymous IP address of 0.0.0.0. Furthermore, L2 switches typically are given a range of MAC addresses with which to work, including a primary address and a range of secondary addresses.

In this disclosure, the availability of a second MAC address is utilized to resolve conflicting requests. In FIG. 3, if the switch 330 receives conflicting requests from the group 340, an additional identity is created, resulting in a single L2 switch 330 having a first identity $L2_a$ located at a first MAC address, and a second identity $L2_b$, located a second MAC address. The result is that requests compatible with a first protocol will be sent from a first host identity having a first MAC address, and requests compatible with a second protocol will be sent from a second identity having a second MAC address. The router, seeing the requests as being from different MAC addresses on the same anonymous IP address, will then be able to properly aggregate the requests and direct the traffic to the appropriate host identity without conflict.

Figure 4:
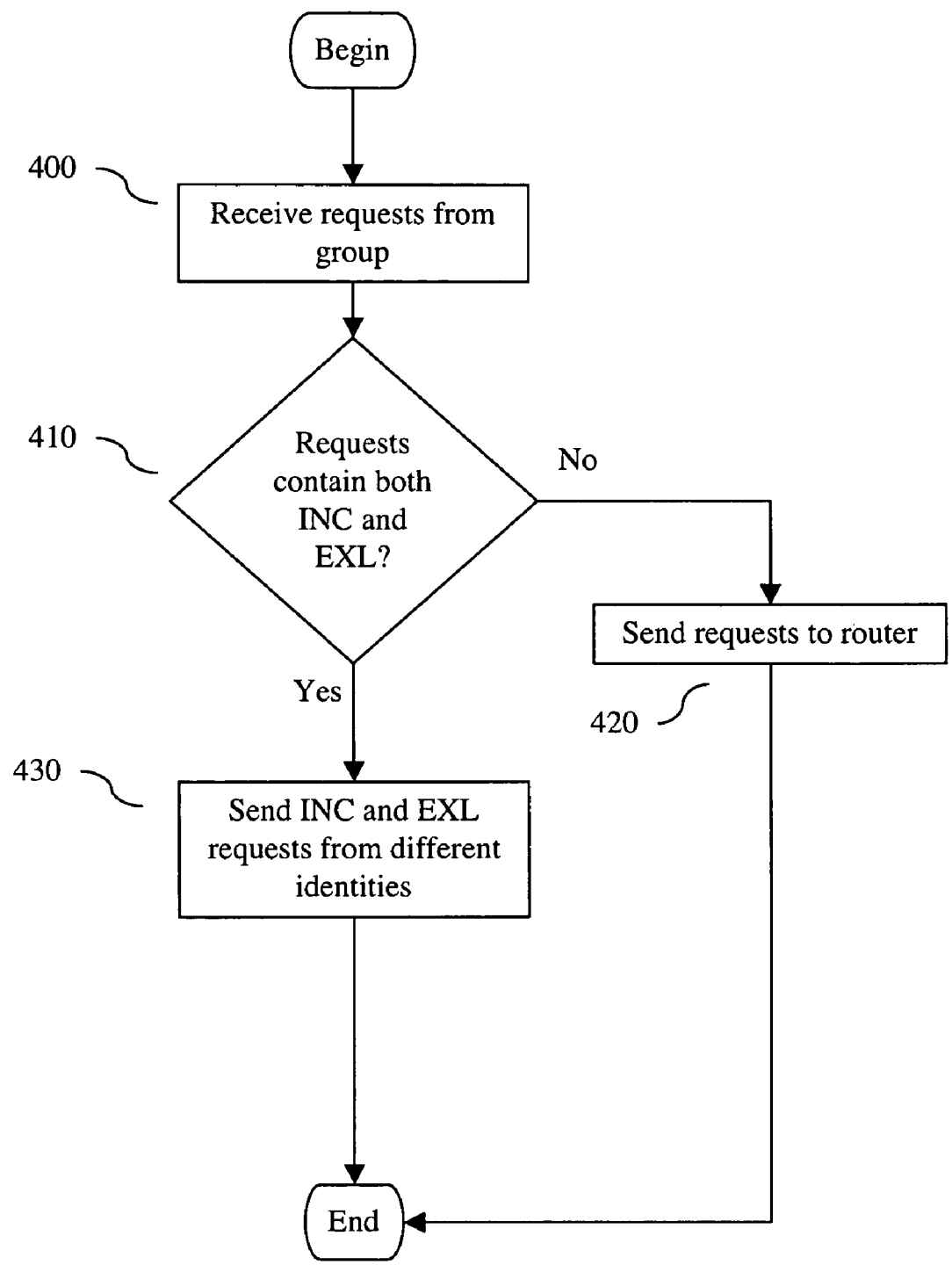
FIG. 4 is a flow diagram of a multicast system configured in accordance with the teachings of this disclosure.

FIG. 4 is a flow diagram showing one disclosed aspect of a method for providing multicast compatibility in accordance with the teachings of this disclosure.

The process begins in act 400 with a L2 switch receiving traffic requests from a group of receivers. In query 410, the switch determines whether the requests from the group will cause a potential conflict when sent to a router. In one disclosed embodiment, the determination make take the form of determining whether the requests contain conflicting IGMP requests, such as an INC request from one receiver and an EXL request from a different receiver.

If there are no conflicting requests, then the switch may forward the requests to a router as is typical in act 430.

However, if there are conflicting requests present, then the switch will separate the requests into at least two compatible types and send the grouped requests from respective and distinct MAC addresses. Thus, requests of one type, such as INC requests, will be sent from a first MAC address, and requests of a different type, such as EXL requests, will be sent from a different MAC address.

As will be appreciated, this disclosure enables zero-configuration operations of IGMP snooping with proxy reporting while maintaining SSM compatibility without the L2 switch knowing in advance whether a group is using SSM or ASM on the routers. While there may be manual configuration, predefined address ranges or additional protocols between routers and the L2 switch, this disclosure does not require any such methods.

The benefits of this disclosure may apply as well to IPv6 with MLD v2. As is known, MLDv2 is substantially the same protocol as IGMPv3, just for IPv6 instead of IPv4. In this embodiment, the address 0.0.0.0 is NOT used as the identity (because there is no such "anonymous address in IPv6), but instead the L2 switch would use two so-called "link-local IPv6 addresses" to send the MLD messages without conflicts to the router.

Additionally, the benefits of this disclosure may apply to a router connected to receivers, if this router is doing "IGMP v3 proxy routing" or "MLD v2 proxy routing."

While embodiments and applications of this disclosure have been shown and described, it would be apparent to those skilled in the art that many more modifications and improvements than mentioned above are possible without departing from the inventive concepts herein. The disclosure, therefore, is not to be restricted except in the spirit of the appended claims.

What is claimed is:

1. A method for providing request compatibility in a multicast system, said method comprising:
   receiving, by a layer 2 switch coupled between a group of receivers and a router, requests for traffic from said group of receivers;
   determining, by said layer 2 switch, whether said traffic requests contain incompatible request types;
   if incompatible request types exist, then separating said traffic requests into at least two groups based on type;
   creating a first host identity at said layer 2 switch associated with a first address available to said layer 2 switch;
   creating a second host identity at said layer 2 switch associated with a second address available to said layer 2 switch; and
   sending requests of a first group of said at least two groups from said first host identity of said layer 2 switch to said router, and sending requests of a second group of said at least two groups from said second host identity of said layer 2 switch to said router, to present an appearance to said router that the requests of different types are from different hosts.

2. The method of claim 1, wherein said incompatible request types include a single-source request and an any-source request.

3. The method of claim 2, wherein said single-source request comprises an IGMP v3 request.

4. The method of claim 2, wherein said any-source request comprises an IGMP v2 request.

5. The method of claim 1, wherein said incompatible request types include an include request and an exclude request.

6. The method of claim 1, wherein said first address available to said layer 2 switch is a first MAC address and said second address available to said layer 2 switch is a second MAC address.

7. An apparatus for providing request compatibility in a multicast system, said apparatus comprising:
a layer 2 switch coupled between a group of receivers and a router;
said layer 2 switch configured to:
receive requests for traffic from said group of receivers;
determine whether said traffic requests contain incompatible request types;
separate said traffic requests into at least two groups based on type if incompatible request types exist;
create a first host identity associated with a first address available to said layer 2 switch;
create a second host identity associated with a second address available to said layer 2 switch; and
send requests of a first group of said at least two groups from said first host identity to said router and send requests of a second group of said at least two groups from said second host identity to said router, to present an appearance to said router that the requests of different types are from different hosts.

8. The apparatus of claim 7, wherein said incompatible request types include a single-source request and an any-source request.

9. The apparatus of claim 8, wherein said single-source request comprises an IGMP v3 request.

10. The apparatus of claim 8, wherein said any-source request comprises an IGMP v2 request.

11. The apparatus of claim 7, wherein said incompatible request types indude an include request and an exclude request.

12. The apparatus of claim 7, wherein said first address available to said layer 2 switch is a first MAC address and said second address available to said layer 2 switch is a second MAC address.

13. An apparatus for providing request compatibility in a multicast system, said apparatus comprising:
means for receiving, at a layer 2 switch coupled between a group of receivers and a router, requests for traffic from said group of receivers;
means for determining, at said layer 2 switch, whether said traffic requests contain incompatible request types;
means for separating said traffic requests into at least two groups based on type if incompatible request types exist;
means for creating a first host identity at said layer 2 switch associated with a first address available to said layer 2 switch;
means for creating a second host identity at said layer 2 switch associated with a second address available to said layer 2 switch; and
means for sending requests of a first group of said at least two groups from said first host identity of said layer 2 switch different types to said router, and sending requests of a second group of said at least two groups from said second host identity of said layer 2 switch to said router, to present an appearance to said router that the requests of different types are from different hosts.

14. The apparatus of claim 13, wherein said incompatible request types indude a single-source request and an any-source request.

15. The apparatus of claim 14, wherein said single-source request comprises an IGMP v3 request.

16. The apparatus of claim 14, wherein said any-source request comprises an IGMP v2 request.

17. The apparatus of claim 13, wherein said incompatible request types include an include request and an exclude request.

18. The apparatus of claim 13, wherein said first address available to said layer 2 switch is a first MAC address and said second address available to said layer 2 switch is a second MAC address.

19. A program storage device readable by a machine, tangibly embodying a program of instructions executable by the machine to perform a method for providing request compatibility in a multicast system, said method comprising:
receiving, by a layer 2 switch coupled between a group of receivers and a router, requests for traffic from said group of receivers;
determining, by said layer 2 switch, whether said traffic requests contain incompatible request types;
if incompatible request types exist, then separating said traffic requests into at least two groups based on type;
creating a first host identity at said layer 2 switch associated with a first address available to said layer 2 switch;
creating a second host identity at said layer 2 switch associated with a second address available to said layer 2 switch; and
sending requests of a first group of said at least two groups from said first host identity of said layer 2 switch to said router, and sending requests of a second group of said at least two groups from said second host identity of said layer 2 switch to said router, to present an appearance to said router that the requests of different types are from different hosts.

20. The device of claim 19, wherein said incompatible request types indude a single-source request and an any-source request.

21. The device of claim 20, wherein said single-source request comprises an IGMP v3 request.

22. The device of claim 20, wherein said any-source request comprises an IGMP v2 request.

23. The device of claim 19, wherein said incompatible request types include an include request and an exclude request.

24. The device of claim 19, wherein said first address available to said layer 2 switch is a first MAC address and said second address available to said layer 2 switch is a second MAC address.

25. A method comprising:
receiving, by a switch coupled between a group of receivers and a router, a plurality of Internet Group Multicast Protocol (IGMP) requests;
determining, by the switch, that the plurality of IGMP requests include both IGMP requests of a first type and IGMP requests of a second type;
separating the plurality of IGMP requests into at least two groups based on their type, a first group to include the IGMP requests of the first type and a second group to include the IGMP requests of the second type; and
sending, by the switch, the IGMP requests of the first group to the router using a first Media Access Control (MAC) address assigned to the switch and sending the IGMP requests of the second group to the router using a second MAC address assigned to the switch, the second MAC address different from the first MAC address, to present an appearance to the router that the IGMP requests of the first type and the IGMP requests of the second type are from different hosts.

26. The method of claim 25, wherein the IGMP requests of the first type are IGMP include requests that request a particular source be included.

27. The method of claim 25, wherein the IGMP requests of the second type are IGMP exclude requests that request a particular source be excluded.

28. The method of claim 25, further comprising:
separately aggregating, by the router, the IGMP requests of the first type and the IGMP requests of the second type.

29. A switch comprising:
at least one port configured to receive a plurality of Internet Group Multicast Protocol (IGMP) requests;
a processor; and
a memory storing instructions that, when executed by the processor, determine that the plurality of IGMP requests include both IGMP requests of a first type and IGMP requests of a second type, separate the plurality of IGMP requests into at least two groups based on their type, a first group to include the IGMP requests of the first type and a second group to include the IGMP requests of the second type, and send the IGMP requests of the first group to a router using a first Media Access Control (MAC) address assigned to the switch and send the IGMP requests of the second group to the router using a second MAC address assigned to the switch, the second MAC address different from the first MAC address, to present an appearance to the router that the IGMP requests of the first type and the IGMP requests of the second type are from different hosts.

30. The switch of claim 29, wherein the IGMP requests of the first type are IGMP include requests that request a particular source be included.

31. The switch of claim 29, wherein the IGMP requests of the second type are IGMP exclude requests that request a particular source be excluded.

32. The switch of claim 29, wherein the instructions, when executed by the processor, separately aggregate the IGMP requests of the first type and the IGMP requests of the second type.

* * * * *

UNITED STATES PATENT AND TRADEMARK OFFICE
CERTIFICATE OF CORRECTION

| | | |
|---|---|---|
| PATENT NO. | : 7,716,363 B1 | Page 1 of 1 |
| APPLICATION NO. | : 10/776940 | |
| DATED | : May 11, 2010 | |
| INVENTOR(S) | : Toerless Eckert | |

It is certified that error appears in the above-identified patent and that said Letters Patent is hereby corrected as shown below:

Col. 5, Line 66, please amend as shown:

request types[[ indude]] include a single-source request and an any-

Col. 6, Line 37, please amend as shown:

request types[[ indude]] include a single-source request and an any-

Signed and Sealed this

Thirteenth Day of July, 2010

David J. Kappos
*Director of the United States Patent and Trademark Office*